(12) United States Patent
Dominique

(10) Patent No.: US 10,578,822 B2
(45) Date of Patent: Mar. 3, 2020

(54) CONTROLLED SHEAR POINT FIBER OPTIC CABLE ADAPTER

(71) Applicant: Jeffrey Michael Dominique, Phoenix, AZ (US)

(72) Inventor: Jeffrey Michael Dominique, Phoenix, AZ (US)

(*) Notice: Subject to any disclaimer, the term of this patent is extended or adjusted under 35 U.S.C. 154(b) by 0 days.

(21) Appl. No.: 15/856,267

(22) Filed: Dec. 28, 2017

(65) Prior Publication Data

US 2019/0324224 A1    Oct. 24, 2019

(51) Int. Cl.
*G02B 6/00* (2006.01)
*G02B 6/44* (2006.01)
*H01R 13/635* (2006.01)
*G02B 6/24* (2006.01)

(52) U.S. Cl.
CPC .............. *G02B 6/4455* (2013.01); *G02B 6/24* (2013.01); *G02B 6/4454* (2013.01); *H01R 13/635* (2013.01)

(58) Field of Classification Search
CPC ...... G02B 6/4455; G02B 6/24; G02B 6/4457; G02B 6/4454; G02B 6/2553; G02B 6/4439; G02B 6/4441; G02B 6/255; H01R 13/635
See application file for complete search history.

(56) References Cited

U.S. PATENT DOCUMENTS

| 5,353,366 | A  | * | 10/1994 | Bossard | G02B 6/2551 385/134 |
| 8,515,233 | B2 |   | 8/2013  | Dominique | |
| 9,774,139 | B1 |   | 9/2017  | Dominique | |
| 2004/0099121 | A1 | * | 5/2004 | Itano | G02B 6/25 83/879 |
| 2005/0226586 | A1 | * | 10/2005 | Watte | G02B 6/25 385/134 |

* cited by examiner

*Primary Examiner* — Ellen E Kim

(57) ABSTRACT

A fiber optic adapter is provided which controls the shear point for a fiber optic wiring system in a traffic control box and other fiber optic applications. The fiber optic adapter includes a bottom disc with a shear chamber and cutting blade, a center gasket, and a top disc with a splice chamber and splice block, for field assembly. Once the fiber optic cables have been positioned in the fiber optic adapter, the adapter is securely mounted to an immobile object in the control box. When a triggering event occurs, such as an accident at the traffic control box, the fiber optic cable is caused to engage the cutting blade to shear the fiber optic cable inside the adapter and not elsewhere in the fiber optic wiring system.

17 Claims, 7 Drawing Sheets

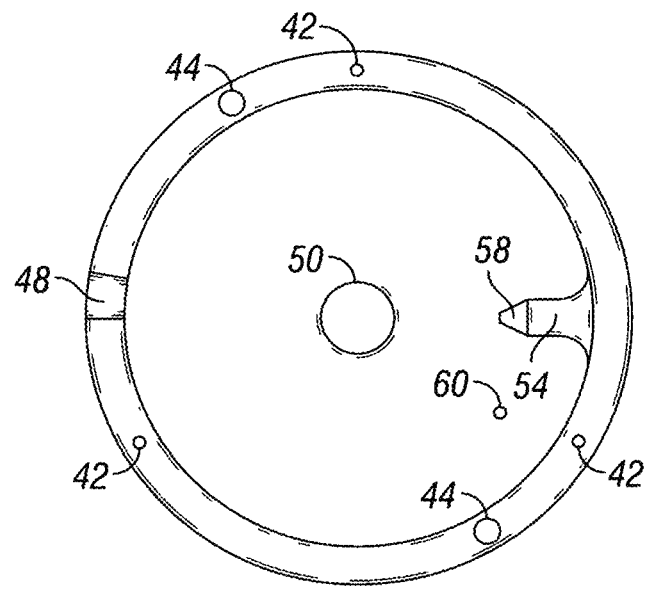
FIG. 3A
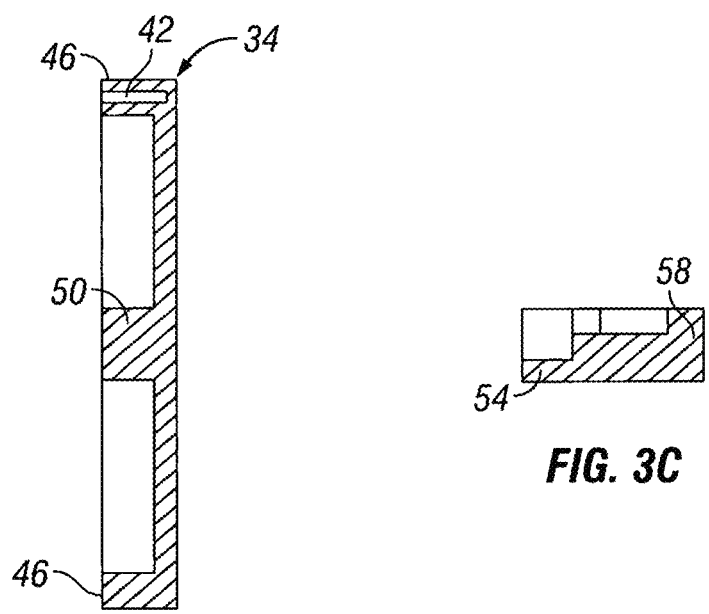
FIG. 3B
FIG. 3C

CONTROLLED SHEAR POINT FIBER OPTIC CABLE ADAPTER

BACKGROUND

This invention pertains to controlled shear point adapters for mounting and connecting fiber optic cables. More particularly, this invention pertains to a controlled shear point fiber optic adapter which includes a sealed enclosure having a shear chamber and a splice chamber. The fiber optic adapter is positioned in a control box or other mounting cabinet structure to facilitate the connection of various wires and cables utilized in the structures, such the fiber optic control wires from the control box to external control elements. When a physical stress is placed on the fiber optic wiring system, a cutting blade in the shear chamber of the adapter is engage to shear the fiber optic cable, such that the shear point of the fiber optic cable occurs in the adapter, to minimize damage is the rest of the fiber optic wiring system.

The power systems utilized in the control boxes or other mounting cabinet structures will typically require physical wires that provide connectivity to a source of power. The control systems will also have significant wiring requirements to provide connectivity between the control elements in the control boxes and the external control elements and sensors. Fiber optic cables may be used for traffic monitoring and control, as well as road structure monitoring, where communicating information to a traffic management center or other control center via a fiber optic communication system is advantageous. The physical power wires and fiber optic cables may be buried in the ground or run behind walls or mounted on poles above ground level. In many situations, it is difficult to access or repair the wires and cables in the event that they are damaged.

In a control box, stable junction connections between terminals in a power system or control system are preferred. The connection requires that the terminals be properly aligned and held steady during operation in a clean connection. These connections are susceptible to damage caused by sudden motion. Sudden motion may damage the physical wires by pulling, tearing, or breaking the physical wires.

The physical wires are generally made up of a plurality of segments connected together through junctions. In many applications where a junction is use to connect a first terminal is connected to a second terminal, a rigid connection is required. The advantage of a rigid connection is that it promotes the connection between the first terminal and the second terminal with transmission mediums such as electrical signals, power supplies, or fiber optic light waves. The disadvantage of such a connection is that any force applied to the connection may result in damage to the physical cable connected by the junction. In order to avoid damage caused by forces applied to the junction, a controlled shear point adapter provides the advantages of controlling the location of the shear point in a fiber optic cable system and of facilitating the splicing sheared fiber optic cables to reconnect the segments of the fiber optic system.

For both the outdoor and in-building control box installations, fiber optic cables are often placed in conduit or other ducts. The conduit provides protection for both physical and environmental abuse. In underground installations, the conduit protects the fiber optic cables from shifting rocks, aggressive rodents, digging equipment, and other hazards. In metropolitan areas, multiple conduits are often grouped as duct banks to accommodate future growth of the wiring infrastructure without major traffic disruptions from cutting and trenching of the streets.

Control boxes are used extensively in the transportation industry for various traffic control and road monitoring applications. The control boxes are generally mounted along the edge of the highway or local streets in proximity to the location of the traffic signals or other traffic control or monitoring elements. One of the most expensive problems in operating such systems is to repair damages to the wiring systems caused by traffic accidents which physically damage the control boxes. The wiring connections inside the control boxes are often ripped apart and destroyed. The physical wires, which are in a conduit buried under ground or mounted on a pole, are damaged within the conduit. In such a case, the wiring may need to be re-laid from the source to the destination. The process of replacing wiring connectors and relaying the physical wires is time consuming, labor intensive, expensive, and dangerous. The longer an intersection is disabled for repair work, the more likely it is for secondary accidents to occur.

In order to minimize the damage caused by sudden physical stress to a wire, it is desirable to control the shear point, which is the point at which the wires break when sufficient stress is applied. When the wiring system is stressed, the cutting blade in the shear chamber of the fiber optic adapter of the present invention ensures that the shear point occurs at the adapter and not elsewhere in the wiring system. By controlling the shear point, damages to the wiring system caused by a physical stress are limited, and the time and expense for repairs are drastically reduced.

The control boxes for traffic control and many other applications, such as street light poles, dynamic message boards, school crossing lights, and speed monitoring poles, are mounted outdoors. When torrential rain or snow storms occur, the inside of the control boxes may have standing water, which may damage the wiring systems and create an electrical hazard for persons around the control boxes. The controlled shear point fiber optic adapter of the present invention is a sealed adapter such that the adapter continues to function when exposed to standing water.

Wiring damages caused by control box accidents are also a concern in industries other than the transportation industry. Control boxes are used in other outdoor and indoor applications where the wires are positioned in underground conduits or other conduit locations where wire repairs would be difficult.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

The present invention includes a controlled shear point fiber optic adapter with a sealed enclosure, which is used to connect fiber optic cables being connected in a control box or other application. The fiber optic adapter includes a top disc which forms a splice chamber, a bottom disc which forms the shear chamber, and a center gasket which is mounted between the top disc and the bottom disc. The fiber optic adapter includes an anchor system to secure the adapter to the concrete floor of the control box or other device. The bottom disc is mounted in proximity to the open end of a conduit used to deliver fiber optic control wires to the control box. The incoming fiber optic cables extending from the conduit are secured in the shear chamber of the bottom disc of the fiber optic adapter and then pass through the center gasket. The drop fiber optic cables extending from the controller in the control box or other similar devices are connected to the incoming fiber optic cables in the splice chamber of the top disc. The top disc, the center gasket, and the bottom disc include threaded mounting holes and an alignment mechanism to facilitate proper connectivity and alignment when connector bolts are to secure the top and bottom discs of the adapter.

Inside the shear chamber of the adapter, the incoming fiber optic cable includes some slack cable which is looped around the wall of the shear chamber of the bottom disc. The incoming fiber optic cable is positioned in a cutting fixture with a cutting blade positioned adjacent to the incoming fiber optic cable. The income fiber optic cable is then passed through the center gasket and is spliced to the drop fiber optic cable in the splice chamber of the top disc. A splice fixture is secured in the splice chamber to facilitate the splicing of the incoming fiber optic cable to the drop fiber optic cable. When an accident occurs and the control box is being damaged, the physical stress will cause the slack fiber optic cable to be pulled into the cutting blade, which shears the fiber optic cable inside the adapter. When the fiber optic cable is sheared at the adapter, no tension forces are transmitted to the incoming fiber optic cable, which eliminates any damages to the incoming fiber optic cable that is buried underground. A new drop fiber optic cable can be quickly and conveniently spliced to the incoming fiber optic cable as part of the repairs to the control box.

In an embodiment, the bottom disc is a flanged disc which forms a shear chamber for mounting, of the cutting blade fixture. The top disc is a similar flanged disc which forms a splice chamber for mounting of the splice fixture. The flanged surface of the bottom disc is secured to the flanged surface of the top disc. A center gasket is positioned between the flanged surfaces of the top and bottom discs to provide a water-proof seal and to separate the shear chamber from the splice chamber.

BRIEF DESCRIPTION OF THE SEVERAL VIEWS OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents. Illustrative embodiments of the present invention are described in detail below with reference to the attached drawing figures, and wherein:

FIG. 3A is a bottom plan view of the bottom disc of the fiber optic adapter; FIG. 3B is a cross-sectional view of the bottom disc taken along a center diameter of the bottom disc of the fiber optic adapter; and FIG. 3C is a cross sectional view of the raised blade holder of the bottom disc.

DETAILED DESCRIPTION

The subject matter of embodiments of the present invention is described with specificity herein to meet statutory requirements. But the description itself is not intended to necessarily limit the scope of claims. For the purpose of teaching inventive principles, some conventional aspects of the best mode may be simplified or omitted. Note that some aspects of the best mode may not fall within the scope of the invention as specified by the claims. Thus, those skilled in the art will appreciate variations from the best mode that fall within the scope of the invention. Those skilled in the art will also appreciate that the features described below can be combined in various ways to form multiple variations of the invention. As a result, the invention is not limited to the specific examples described below, but only by the claims and their equivalents. Although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

U.S. Pat. No. 8,515,233, entitled "Adapter for Mounting Cable Connectors," and pend U.S. Pat. No. 9,774,139 entitled "Controlled Shear Point Wiring Adapter" by Jeffrey Michael Dominique, are incorporated by reference herein in their entirety.

Figure 1:
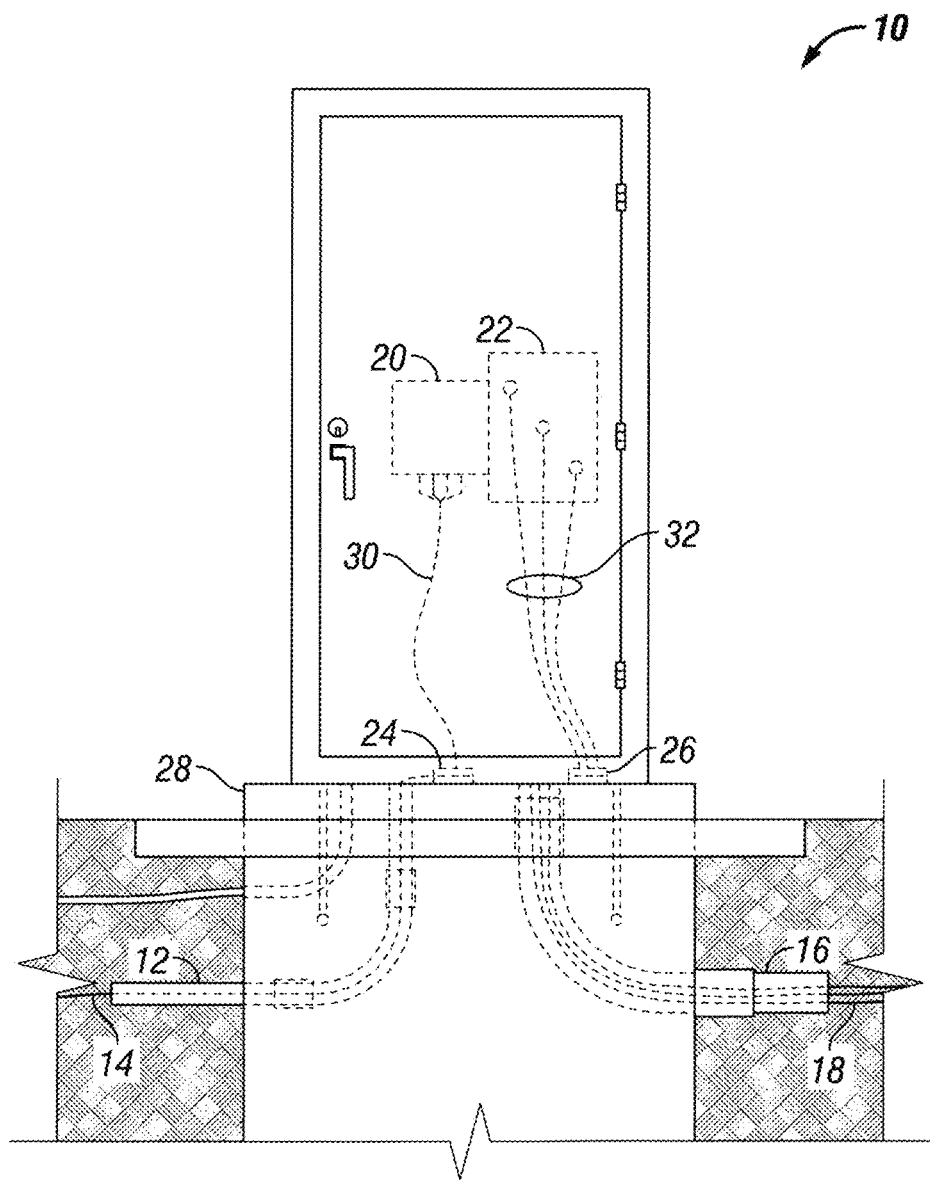
FIG. 1 shows a control box which is used for traffic control and road monitoring, said control box including two conduits entering the bottom of the control box: (i) a control wire conduit for the incoming fiber optic cable with the fiber optic adapter of the present invention mounted in proximity to the conduit opening at the bottom of the control box, and (ii) a power wire conduit with an adapter mounted in proximity to the conduit opening at the bottom of the control box.

Referring now to FIG. 1, a control box 10 provides an enclosure mounted on a concrete pedestal 28. For traffic and road monitoring applications, the control box 10 is typically positioned on the side of the road at an intersection or other strategic location. Similar control boxes may be used for other control transmission or power transmission applications. The control box 10 includes two conduits entering the control box. For traffic control applications, the first conduit 12 contains power wire 14 to provide 120 volt or 240 volt electrical power to the control box 10. The second conduit 16 contains low voltage fiber optic control wires 18. The fiber optic control wires 18 may be used to send electrical control signals between the traffic light signal devices, video cameras, crosswalk systems, pavement sensors, and other traffic or road devices (not shown), which are mounted in proximity to the control box 10. The power system components 20 and the control system components 22 are positioned in the control box 10. The conduits 12, 16 could also enter the side or top of control box 10 for special traffic locations or for control boxes in industries other than traffic control and monitoring.

One of the problems faced by state and local governments in maintaining traffic control boxes 10 mounted along a street is the damage caused to the control boxes 10 by traffic accidents or other impact accidents. After an accident, the control box 10 itself and the power system components 20 and the control system components 22 may need to be replaced. But the costs are increased significantly if the power wire 14 or control wires 18 are damaged in an accident. If the power wire 14 or control wires 18 are ripped apart or otherwise damaged, such wires will need to be replaced. This often involves significant digging with special equipment, pavement repair work, and other costly repair services to reestablish the connections.

In addition to traffic control boxes, the power fiber optic adapter and the control fiber optic adapter can be used in other devices and applications where controlling the shear point of a stressed wiring is beneficial, such as production equipment, power supplies, and applications where wires extend through a concrete pedestal.

In FIG. 1, the controlled shear point fiber optic adapter 26 of the present invention is mounted on the concrete pedestal 28 in proximity to the openings of conduit 16 for connection to the fiber optic control wires 18. Alternatively, the fiber optic adapter 26 could be mounted on a rack in the traffic control box 10, adjacent to the control systems component 22. A power adapter 24 is mounted on the concrete pedestal 28 to facilitate connection to the power wires 14, which are used to deliver alternating current power through the power wire segment 30 to the power system components 20 in control box 10.

The control system components 22 may include a power converter to convert the AC power to direct current power or to low voltage AC power, such as 24 volts DC or AC or 12 volts DC or AC. The logic portion of the controllers utilize the direct current power or low voltage AC power to send and receive traffic light power or control signals from the sensors, detectors, light switches and other control components. The fiber optic cables 18 are multi-conductor fiber optic control wires. The fiber optic control cables 18, commonly referred to as drop cables, may have anywhere from two conductors up to twelve total conductors, but most control cables 18 in the traffic control applications will have two to four conductors per interface device, with potentially multiple devices. The fiber optic control cables 18 include an outer jacket to protect the inner conductors. The control cables 18 will also include a strength member, usually made of aramid yarn. The strength member absorbs the tension needed to pull the cable and provides cushioning for the fibers. Aramid fibers are used not only because they are strong, but they do not stretch. If pulled hard, they will not stretch but eventually break when tension exceeds their limits. The inner conductors are individually insulated and usually twisted around the strength member or other center core. When the fiber optic control cables 18 exit the conduit 16, the conductors in the fiber optic control cables are 18 are connected to the fiber optic adapter 26. To complete the connection to the control systems components 20, the control wire drop segments 32 are connected between the fiber optic adapter 26 and the terminals for the control system components 20.

FIGS. 2-5 show the configuration of the fiber optic adapter 26 of the present invention. The fiber optic adapter 26 may be made of any material, including non-conductive metal, plastic, or rubber. The preferred material and methodology for making the fiber optic adapter 26 is a molded or machined, high density polymer, such as Delrin® acetal resin, or other similar non-conducting material. The fiber optic adapter 26 has two main components, a bottom disc 34 and a top disc 36. When assembled, a center gasket 38 is positioned between the bottom disc 34 and the top disc 36. Assembly screws 40 extend through the aligned, machine holes 42 in the top disc 36, the center gasket 38, and the bottom disc 34. These three components also have two mounting holes 44. Two mounting bolts (not shown) or other connectors are used to mount the fully assembled fiber optic adapter 26 to the pedestal 28 or the mounting rails in the traffic control box 10. The preferred shape for the bottom disc 34, top disc 36, and the center segment 38 is circular, but alternate shapes, such as square or rectangular, could also be used to form the fiber optic adapter.

Figure 2:
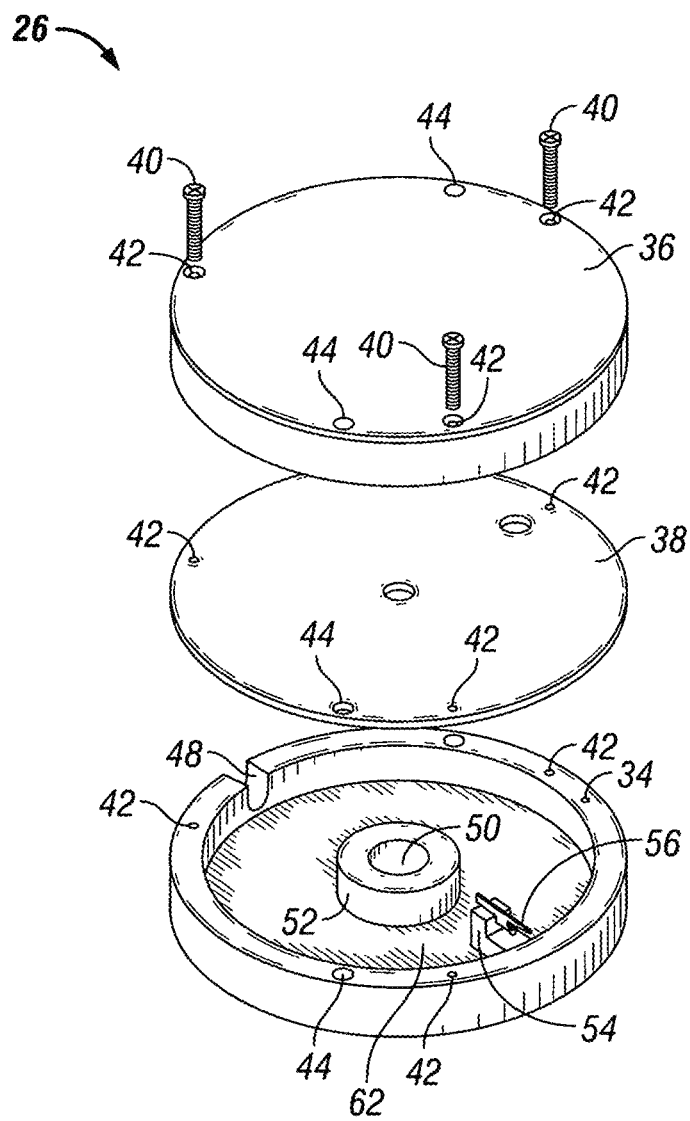
FIG. 2 is an exploded, top perspective view of the fiber optic adapter showing the bottom disc, the center gasket, and the top disc of the fiber optic adapter.

FIGS. 2-3 show additional details regarding the bottom disc 34. An edge extension 46 is formed about circumference of the bottom disc 34 to create a shear chamber. The edge extension 46 has a u-shaped cable access aperture 48 formed in the edge to facilitate the placement of the fiber optic cable 18 in the shear chamber of the bottom disc 34. A split ring gasket (not shown) or other type of sealing gasket is applied to the fiber optic cable 18 when inserted into the u-shaped cable access aperture 48. A center post 50 is also formed on the surface of the bottom disc 34, the center post 50 having the same height as the edge extension 46. A free-spinning polymer fiber management center spool 52 is positioned on the center post 50.

A blade holder 54 is also formed on the surface of the bottom disc 34 to secure a cutting blade 56. A slot 58 is formed in the upper surface of the blade holder 54, and the body of the cutting blade 56 is inserted and secured in the slot 58. The cutting blade 58 has a single cutting edge facing downward, and the cutting edge is spaced apart from the surface of the bottom disc 34, adjacent to the edge extension 46. A clip hole 60 is formed in the bottom disc 34 in proximity to the blade holder 54. A retention clip 62 is secured in the clip hole 60. The retention clip 62 is positioned adjacent to the edge extension 46, and is used to anchor loose fibers such that tension is created when the fiber is pulled in either direction. The retention clip 62 is made of aluminum or other flexible metal.

Figure 4A:
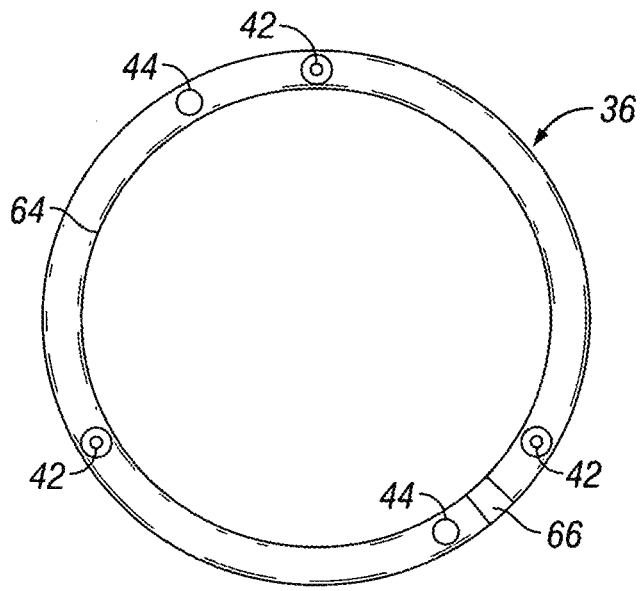
FIG. 4A is a top plan view of the top disc of the fiber optic adapter.
Figure 4B:
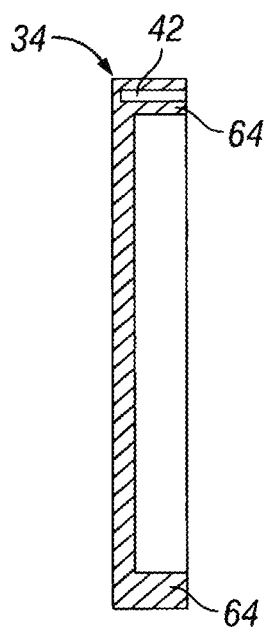
FIG. 4B is a cross-sectional view of the top disc taken along a center diameter of the top disc of the fiber optic adapter.

FIG. 4 shows additional details regarding the top disc 36. An edge extension 64 is formed about circumference of the top disc 36 to create a splice chamber. The edge extension 64 has a u-shaped cable access aperture 66 formed in the edge to facilitate the placement of the control wire drop segment 32 in the splice chamber of the top disc 36. A split ring gasket (not shown) is applied to the control wire drop segment 32 when inserted into the u-shaped cable access aperture 66.

One or more splice holders 68 (FIGS. 6-7) are mounted on the surface of the top disc 36 in the splice chamber. A splice holder 68 may be secured to the top disc 36 by screws, studs, glue or other mounting means. When multiple splice holders 68 are used, the splice holders 68 may be mounted adjacent to each other on the surface of the top disc 36. In addition, the splice holders 68 may be stacked one on top of the other up to the height of the edge extension 64.

Figure 5:
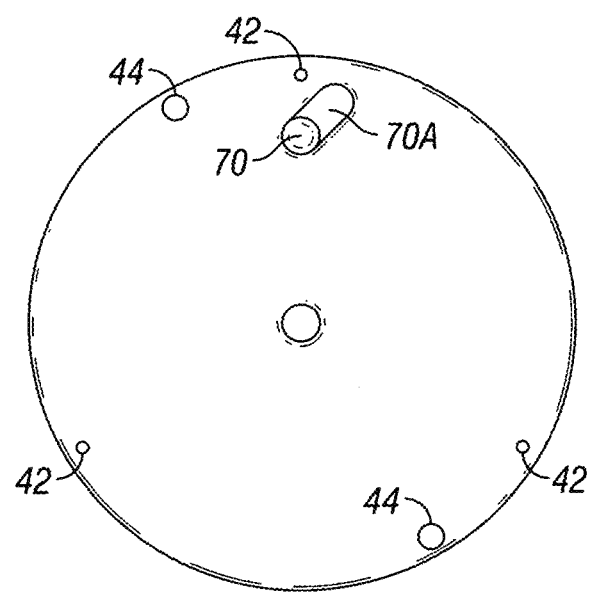
FIG. 5 is a top plan view of the center gasket of the fiber optic adapter.

FIG. 5 shows the center gasket 38 which is positioned between the bottom disc 34 and the top disc 36. The center gasket 38, which is made of rubber, polymer, or other similar elastic material, separates the shear chamber in the bottom disc 34 from the splice chamber in the upper disc 36. The center gasket 38 includes one or more apertures 70 to facilitate the passing of the fiber optic cable from the shear chamber into the splice chamber once the fiber optic adapter 26 has been assembled for use. The aperture 70 is a slotted aperture 70A at the edge of the upper disc 36 such that the fiber optic conductors can be slid through the slot into the aperture 70. When the fiber optic adapter is fully assembled, the center gasket ensures that the cutting blade 56 cannot move from the slot of the blade holder 54 in the shear chamber of the bottom disc 34.

Figure 6:
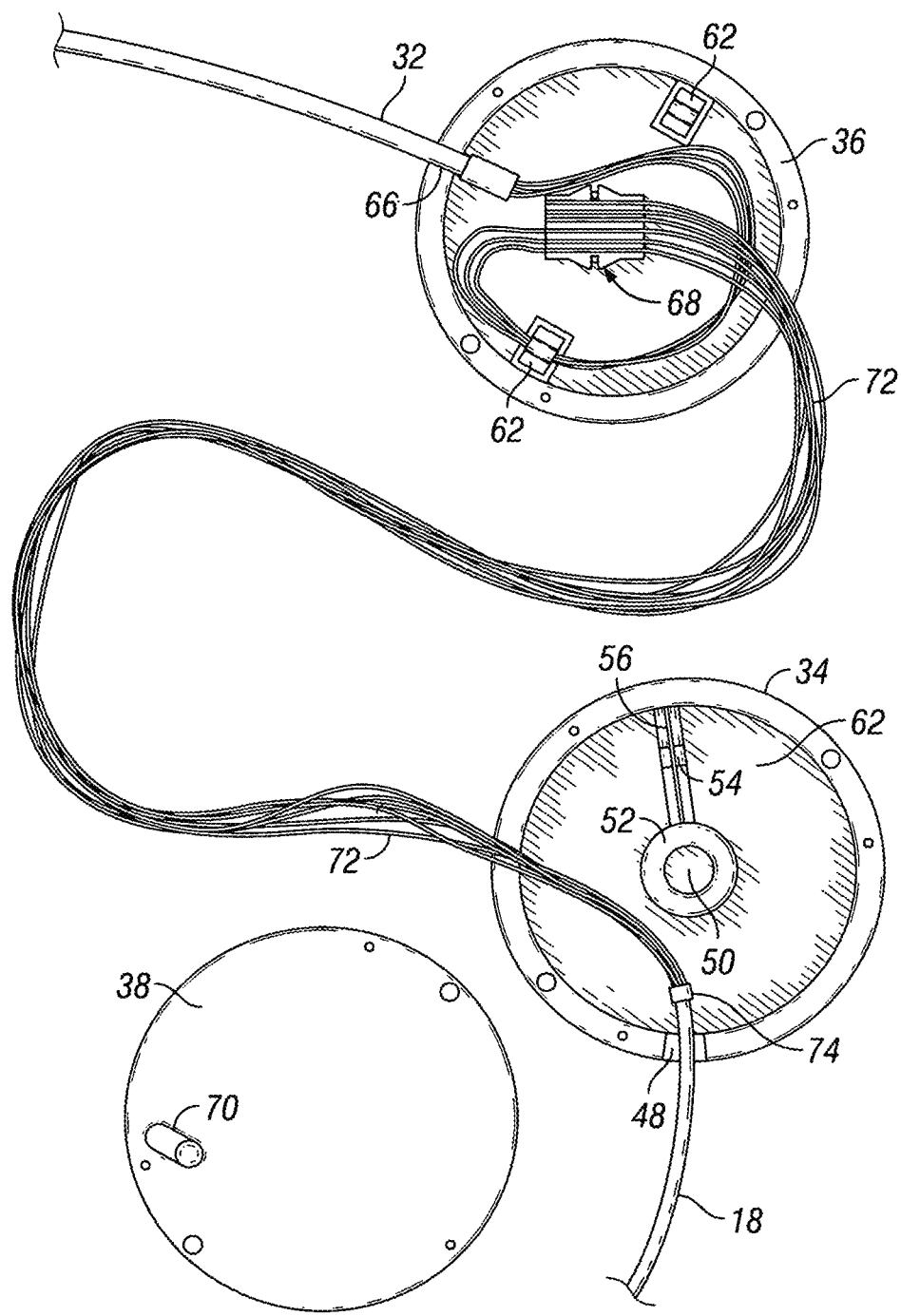
FIG. 6 is a view of the fiber optic adapter prior to field assembly, showing the incoming cable entering the shear chamber of the bottom disc and being connected to a separate drop cable at the splice fixture in the splice chamber of the top disc.
Figure 7:
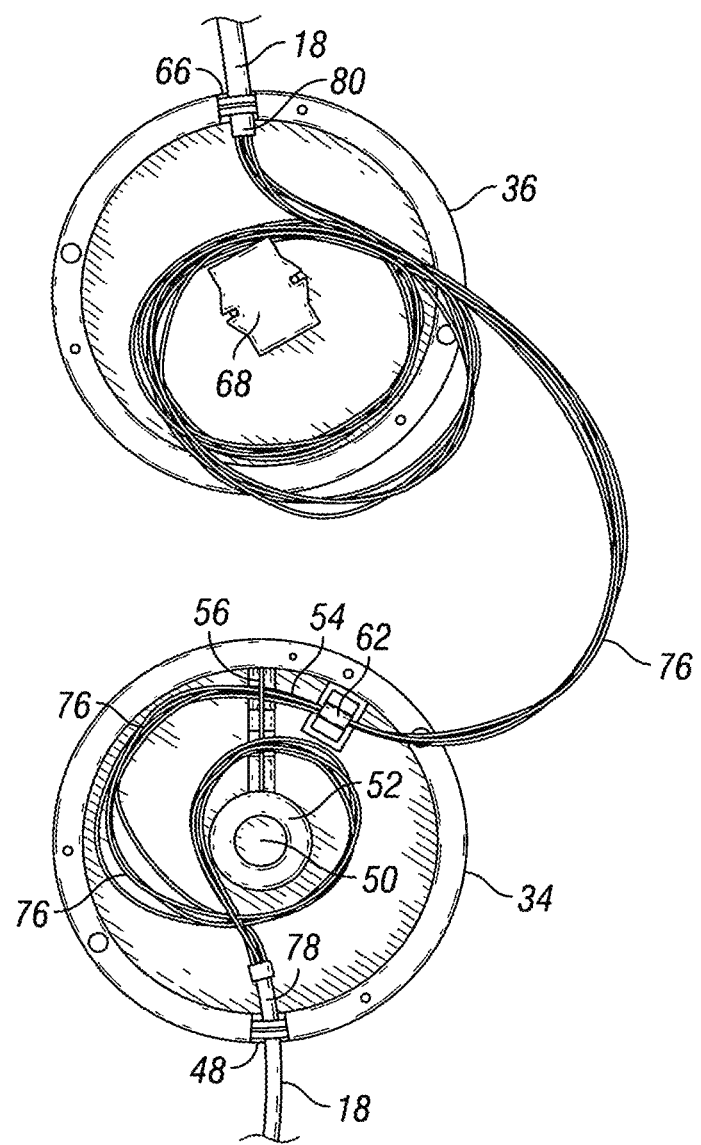
FIG. 7 is an alternative view of the fiber optic adapter prior to field assembly, showing the incoming cable entering the shear chamber of the bottom disc, passing through the splice chamber, and exiting the top disc without any splicing.

FIGS. 6-7 show the field assembly set up for the fiber optic adapter 26. When the one or more fiber optic control wires 18 exit the conduit 16, there are several options for connecting the fiber optic control wires 18 to the fiber optic adapter 26 and then completing the connection to the control system components 22. When control wire drop segments 32 are used, the fiber optic control wires 18 and the control wire drop segments 32 are spliced together in the splice holder 68 of the top disc 36, as shown in FIG. 6. An end segment of the outer jacket at the end of the fiber optic control wire 18 is stripped off to expose the insulated conductors 72. The end of the jacket 74 of the fiber optic control wire 18 is inserted into the cable access aperture 48 of the bottom disc 34. The ends of insulated conductors 72 are positioned in the splice holder 68. The control wire drop segment 32 is positioned in the cable access aperture 66 of the top disc 36 and its conductors are spliced to insulated conductors 72 in the splice holder 68. The excess length of the insulated conductors 72 will be spooled in the bottom disc 34 and the top disc 36, as described below and shown in FIG. 7. Once the insulated conductors 72 have been spooled in the bottom disc 34 and top disc 36 and the insulated conductors 72 have been secured by the retention clips 62 and positioned under the cutting blade 56, the insulated conductors are slid into the aperture 70 of the center gasket 38 and the top disc 36 is secured to the center gasket 38 and the bottom disc 34 to complete assembly of the fiber optic adapter 26.

Alternatively, the fiber optic control wires 18 could extend into the control box 10 and be connected directly to the control system components 22. As shown in FIG. 7, a non-end segment of the outer jacket of the fiber optic control wire 18 is removed for field assembly of the fiber optic adapter 26 to expose the insulated conductors 76. The jacket is removed in proximity to the mounting location for the fiber optic adapter 26. The one end of the jacket 78 of the fiber optic control wire 18 is inserted into the cable access aperture 48 of the bottom disc 34, and the other end of the jacket 80 is inserted into the cable access aperture 66 of the top disc 36. Since there are no ends to splice in the fiber optic adapter 26, the splice holder 68 of the top disc 36 is not utilized in the initial configuration.

When the fiber optic control wires 18 are installed underground, there will be significant amount of slack fiber which is placed above ground for use in completing the connections to the control system elements 22 in the control box 10. A field technician installing the fiber optic adapter 26 in the field will typically use four to eight feet of this cable for spooling of slack fiber in the fiber optic adapter 26. The outer jacket of the fiber optic control wires 18 is removed to expose the insulated conductors. The insulated conductors include two or more individual fibers. Each of the individual fiber strands is color-coded per the applicable electrical wiring standards.

The spooling arrangement in the shear chamber of the bottom disc 34, as shown in FIG. 7, is the same for all of the embodiments. The insulated fiber strands 76 are wrapped around the circular center spool. 52 along the outer wall of the extended edge 46, at least one or more times. In the initial wraps, the insulated fiber strands are positioned between the blade holder 54 and the circular center spool 52, and are not positioned to engage the cutting blade 56. The cutting blade 56 is a removable cutting blade. The cutting blade 56 is removed from the slot 58 in the blade holder 54 when the insulated fiber strands 76 are being wrapped. On the final wrap, the insulated fiber strands 76 are positioned in the cutting space and the cutting blade 56 is reinstalled in the slot 58 adjacent to the final wrap of the insulated fiber strands. The cutting blade 56 is secured in the slot 58 when the center gasket 38 is assembled above the bottom disc 34.

In order to make sure that the insulated fiber strands 76 remain taut and in position under the cutting blade 56, the final wrap of the insulated fiber strands 76 is secured under the retention clip 62. Glue or other adhesives may also be used to secure the insulated fiber strands 76 under the cutting blade 56. Securing the insulated fiber strands 76 facilitates the cutting action when tension is supplied to the insulated fiber strands 76 by ensuring that the tension causes the insulated fiber strands 76 to engage the cutting blade 56.

After the insulated fiber strands are secured under the cutting blade 56, the insulated fiber strands are passed through the slot 70A of the aperture 70 of the center gasket 38 (center gasket 38 is not shown in FIG. 7) and then positioned in the splice chamber of the top disc 36. An additional two to four feet of slack insulated fiber strands are included in the splice chamber for spooling. In the embodiment shown in FIG. 6, the insulated fiber strands 72 are secured to the splice holder 68, where they are then sliced with the fiber optic conductors of the control wire drop segments 32. In the embodiment shown in FIG. 7, the insulated fiber strands 76 are positioned around the splice holder 68 and are passed through the cable access aperture 66 of the top disc 36.

To complete the field assembly process of the fiber optic adapter 26, the bottom disc 34, the center gasket 38, and the top disc 36 are placed on top of each other and the assembly holes 42 are aligned. The three assembly screws 40 are used to secure the parts to complete the assembly process and create a water resistant seal. The assembled fiber optic adapter 26 is then ready for mounting on the floor of control box 10 or on a wall rack in such control box 10.

In field use, it is preferable that the fiber optic adapter 26 be water resistant due to problems caused by exposure to water, such as flood conditions. The three assembly screws provide sufficient force to seal the edges of the bottom disc 34, the center gasket 38, and the top disc 36. The rubber gasket 38 creates a barrier from external elements. The only openings in the assembled fiber optic adapter 26 are the point of access aperture 48 in the bottom disc 34 and the point of access aperture 66 in the top disc 36. O-ring sealing gaskets or other gaskets may be used to seal the access aperture 48, 66. In addition, a silicon sealant or other quick-drying sealant (not shown) may be inserted into the access aperture 48, 66. The sealant can be inserted in the field by a technician using a standard tube of the sealant. The hardened sealant will provide a waterproof seal, but will not damage the insulated fiber strands or otherwise adversely impact the conductivity, and will not restrict the shear action.

Figure 8:
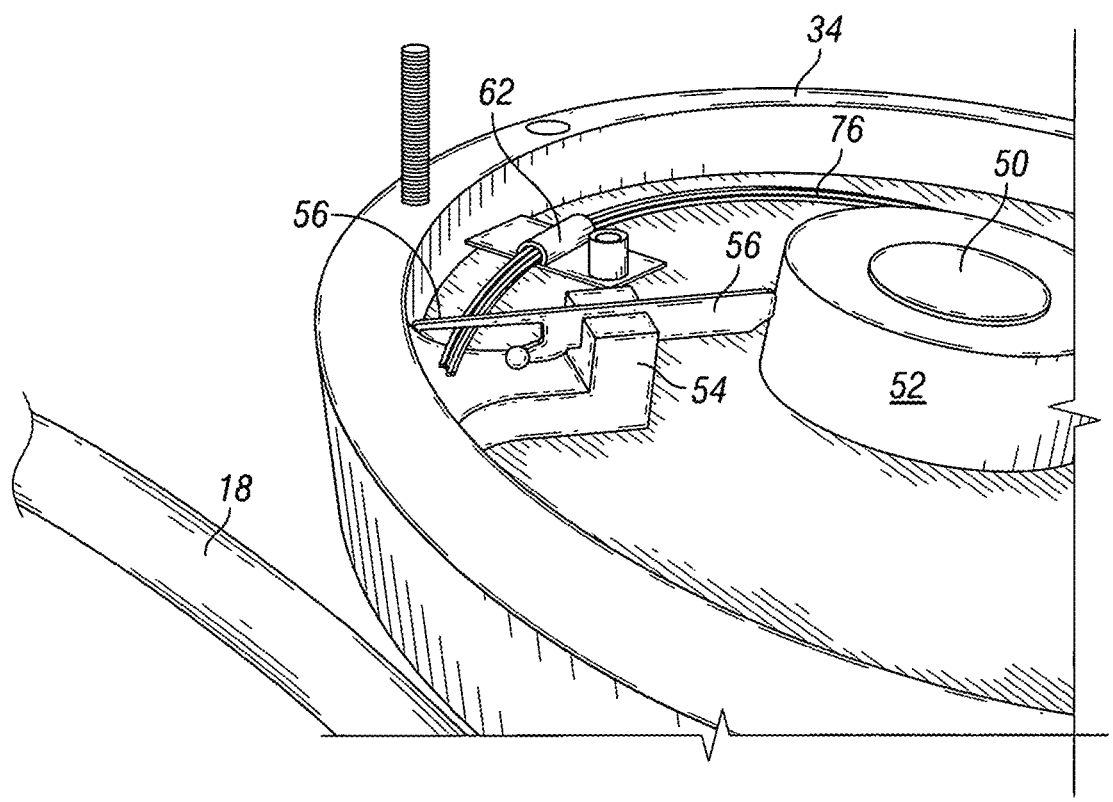
FIG. 8 is a perspective view of the shear chamber of the bottom disc of the fiber optic adapter, showing the fiber optic cable after it has been cut by the cutting blade.

Once the fiber optic adapter 26 is installed in the control box 10, a triggering action pulls on the insulated fiber strands 76 in the fiber optic adapter 26 such that the insulated fiber strands 76 are pulled and drawn tight around the free-spinning wheel 50 until the insulated fiber strands 76 are eventually pulled into the cutting blade 56 to cut the insulated fiber strands 76. In a traffic control box, a triggering event is usually a motor vehicle accidently running into the control box 10. The tension created at the control box is sufficient to cut the insulated fiber strands 76 before the tension is transmitted to cause damage to the fiber optic wires 18 located underground. FIG. 8 shows the end of the insulated fiber strands 76 after the cutting blade 56 has been engaged to cut the insulated conductor inside the shear chamber of the lower disc 34 of the fiber optic adapter 26. The excess insulated fiber strands 76 which were spooled about the center spool 52 when the fiber optic adapter 26 is assembled are pulled out of the bottom disc 34 during the trigger event.

In some cases, the strength members (not shown in the drawings) of the fiber optic wires 18 may inhibit the cutting action at the cutting blade 56. When the jacket of a fiber optic cable 18 is removed during the assembly process, the strength members may be separated and secured apart from the insulated fiber strands 76. This reduces the tension required to cut the fiber strands, which helps to ensure that the insulated fiber strands 76 are cut inside the fiber optic adapter 26 when a triggering event occurs.

Fiber optic cables, which are made of glass, will break and shatter in multiple locations when placed under extreme tension. When an accident or other triggering event occurs, this cutting functionality allows the shear point of the control wiring system to be controlled at the fiber optic adapter 26. The shear point is above ground in the control box 10, where the control wire drop segment 32 is easier to replace than the control wires 18 which are buried under ground. Control wire drop segments 32 and other wires within the control box 10, and any devices that are connected to the wires will also typically incur less damage because of the shear point control.

After a triggering event has occurred, the insulated conductor 76 and the other components in the control box may not need to be replaced, but just spliced back together. Since the fiber optic cable has been sheared above ground, no work will be required on the underground fiber optic wires 18. A new fiber optic cable segment can be installed from the new control system elements to the splice holder in the fiber optic adapter 26, and a field technician can conveniently splice the fiber optic cable 18 to the new fiber optic cable segment inside the splice chamber.

The fiber optic adapter 26 is provided with connectors suitable for the interface to the control system elements 22 in a traffic control box 10. Any industries that utilize extensive fiber optic cables where a controlled shear point would minimize damage caused by a triggering event could have use for the adapter, such as telecommunications, computer networks, security, manufacturing and military.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A fiber optic adapter for controlling the shear point of conductors in a fiber optic wiring system, said fiber optic adapter being located in proximity to a conduit opening through which incoming fiber optic conductors are extended, said fiber optic adapter comprising:
   a bottom disc, said bottom disc including a raised edge formed around the inner circumference of the bottom disc to form a shear chamber, a rotatable spool secured in the center of the bottom disc, a cutting blade secured in a blade fixture in proximity to the raised edge, and an access aperture formed in the raised edge to facilitate the positioning of fiber optic conductors adjacent to the cutting blade in the shear chamber of the bottom disc;
   a top disc, said top disc including a raised edge formed around the inner circumference of the top disc to form a splice chamber, a splice holder, and an access aperture formed in the raised edge to facilitate the positioning of fiber optic conductors in the splice chamber of the top disc;
   a center gasket positioned between the top disc and the bottom disc, whereby the center gasket closes the shear chamber of the bottom disc and closes the splice chamber of the top disc, said center gasket including a slotted aperture to facilitate the extension of fiber optic conductors between the shear chamber and the splice chamber; and
   a plurality of assembly screws for securing the bottom disc, the center gasket, and the top disc into the assembled fiber optic adapter of the present invention, whereby a triggering event will create tension on the fiber optic conductors in the fiber optic adapter, such that the fiber optic conductors are sheared inside the shear chamber of the fiber optic adapter when the fiber optic conductors engage the cutting blade.

2. The fiber optic adapter of claim 1, wherein said bottom disc includes a retention clip secured to the bottom disc in proximity to the cutting blade.

3. The fiber optic adapter of claim 1, including a plurality of mounting holes extending from the outer edge of the top plate, through the center gasket, and through the bottom disc.

4. The fiber optic adapter of claim 1, wherein the access aperture of the bottom disc includes a gasket and the access aperture of the top disc includes a gasket, whereby said access apertures are sealed to prevent moisture from entering the shear chamber and the splice chamber.

5. The fiber optic adapter of claim 1, wherein the center gasket is made from rubber or from polymer, whereby said center gasket forms a seal between the bottom disc and the top disc to prevent moisture from entering the shear chamber and the splice chamber of the fiber optic adapter.

6. The fiber optic adapter of claim 1, wherein said blade fixture includes a slot for securing the cutting blade, whereby the cutting blade can be removed and reinserted in the slot when positioning fiber optic conductors in the shear chamber during the assembly process, and wherein the cutting blade is secured in the slot when the center gasket is assembled between the bottom disc and the top disc.

7. The fiber optic adapter of claim 1, including a plurality of splice holders mounted in the splice chamber of the top disc.

8. A method for connecting, in a control box, a fiber optic wire having a plurality of conductors to a corresponding fiber optic wire drop segment having a plurality of conductors, and using a fiber optic adapter to provide shear point control, such that when the control box is damaged and stress is applied to the fiber optic wire and the wire segment, the shear point for the stressed fiber optic wire and fiber optic drop wire segment occurs at the fiber optic adapter, the method comprising:
- stripping an outer jacket of an end segment of the fiber optic wire to expose the conductors;
- positioning conductors of the fiber optic wire through an access aperture into a bottom disc of the fiber optic adapter and securing the conductors adjacent to a cutting blade in a shear chamber of the bottom disc;
- positioning the conductors of the fiber optic wire through an aperture of a center gasket and into a splice chamber of a top disc;
- positioning ends of the conductors of the fiber optic wire in a splice holder located in the splice chamber;
- positioning conductors of the fiber optic drop wire segment through an access aperture formed in the top disc of the fiber optic adapter and positioning ends of the conductors in the splice holder in the splice chamber of the top disc;
- splicing the ends of the conductors of the fiber optic wire to the ends of the conductors of the fiber optic drop wire segment and positioning the conductors in the splice holder;
- securing the bottom disc, the center gasket, and the top disc, using the assembly screws, to assemble the fiber optic adapter, and
- mounting the fiber optic adapter to a secure surface in the control box.

9. The method of claim 8, including the positioning of a gasket into the access aperture of the bottom disc and the positioning of a gasket into the access aperture of the top disc, whereby the assembled fiber optic adapter is sealed against moisture.

10. The method of claim 8, wherein positioning of the conductors of the fiber optic wire in the bottom disc includes spooling the conductors about a rotatable center spool positioned in the shear chamber of the bottom disc.

11. The method of claim 8, wherein positioning of the conductors of the fiber optic wire in the top disc includes spooling the conductors about the splice holder positioned in the splice chamber of the top disc.

12. The method of claim 8, including the additional step of separating a strength member from the conductors before positioning the conductors adjacent to the cutting blade in the shear chamber of the bottom disc.

13. A method for connecting, in a control box, a fiber optic wire having a plurality of conductors to a plurality of control system components, and using a fiber optic adapter to provide shear point control, such that when the control box is damaged and stress is applied to the fiber optic wire, the shear point for the stressed fiber optic wire occurs at the fiber optic adapter, the method comprising:
- stripping an outer jacket of a non-end segment of the fiber optic wire to expose the conductors;
- positioning conductors of the fiber optic wire through an access aperture into a bottom disc of the fiber optic adapter and securing the conductors adjacent to a cutting blade in a shear chamber of the bottom disc;
- positioning the conductors of the fiber optic wire through an aperture of a center gasket and into a splice chamber of a top disc;
- positioning the conductors of the fiber optic wire in the splice chamber of the top disc;
- positioning conductors of the fiber optic wire to an access aperture formed in the top disc of the fiber optic adapter;
- extending the fiber optic wire to the control system components and connecting ends of the conductors of the fiber optic wire to terminals for the control system components;
- securing the bottom disc, the center gasket, and the top disc, using the assembly screws, to assemble the fiber optic adapter, and
- mounting the fiber optic adapter to a secure surface in the control box.

14. The method of claim 13, including the positioning of a gasket into the access aperture of the bottom disc and the positioning of a gasket into the access aperture of the top disc, whereby the assembled fiber optic adapter is sealed against moisture.

15. The method of claim 13, wherein positioning of the conductors of the fiber optic wire in the bottom disc includes spooling the conductors about a rotatable center spool positioned in the shear chamber of the bottom disc.

16. The method of claim 13, wherein positioning of the conductors of the fiber optic wire in the top disc includes spooling the conductors about the splice holder positioned in the splice chamber of the top disc.

17. The method of claim 13, including the additional step of separating a strength member from the conductors before positioning the conductors adjacent to the cutting blade in the shear chamber of the bottom disc.

\* \* \* \* \*